(12) United States Patent
Wei

(10) Patent No.: US 10,362,223 B2
(45) Date of Patent: Jul. 23, 2019

(54) IMAGING DEVICE AND ELECTRONIC DEVICE

(71) Applicant: GUANGDONG OPPO MOBILE TELECOMMUNICATIONS CORP., LTD., Dongguan (CN)

(72) Inventor: Yi Wei, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/616,074

(22) Filed: Jun. 7, 2017

(65) Prior Publication Data

US 2018/0152635 A1 May 31, 2018

(30) Foreign Application Priority Data

Nov. 29, 2016 (CN) .......................... 2016 1 1079262
Nov. 29, 2016 (CN) ..................... 2016 2 1299136 U

(51) Int. Cl.
*G02B 15/14* (2006.01)
*H04N 5/232* (2006.01)
(Continued)

(52) U.S. Cl.
CPC ........... *H04N 5/23238* (2013.01); *G02B 7/10* (2013.01); *G02B 13/0065* (2013.01);
(Continued)

(58) Field of Classification Search
USPC ....................................................... 359/676
See application file for complete search history.

(56) References Cited

U.S. PATENT DOCUMENTS

2003/0214726 A1* 11/2003 Mihara .................. G02B 13/04
359/676
2004/0105025 A1 6/2004 Scherling
(Continued)

FOREIGN PATENT DOCUMENTS

CN 1648710 A 8/2005
CN 1780363 A 5/2006
(Continued)

OTHER PUBLICATIONS

PCT/CN2017/088313 English translation of international search report and written opinion dated Sep. 15, 2017, 14 pages.
(Continued)

*Primary Examiner* — James C. Jones
(74) *Attorney, Agent, or Firm* — Lathrop Gage LLP

(57) ABSTRACT

The present disclosure provides an imaging device including a wide-angle camera and a telephoto camera. A field of view of the telephoto camera is located in a field of view of the wide-angle camera, the telephoto camera includes a telephoto lens. The telephoto lens includes: at least one first lens element, a light reflecting element and at least one second lens element arranged sequentially from an object side to an image side along a light axis. The light reflecting element is configured to make the light axis to reflect from a first direction to a second direction. An electronic device including the imaging device is further provided. In the imaging device and the electronic device above, the light axis of the telephoto camera is reflected, lowering a height of the telephoto lens and a height of the telephoto camera.

15 Claims, 3 Drawing Sheets

(51) Int. Cl.
  *G02B 7/10* (2006.01)
  *H04N 5/225* (2006.01)
  *G02B 13/00* (2006.01)
  *G02B 13/02* (2006.01)
  *G03B 17/17* (2006.01)
  *G03B 19/02* (2006.01)

(52) U.S. Cl.
  CPC .............. *G02B 13/02* (2013.01); *G02B 15/14* (2013.01); *G03B 17/17* (2013.01); *G03B 19/023* (2013.01); *H04N 5/2254* (2013.01); *H04N 5/2258* (2013.01)

(56) References Cited

U.S. PATENT DOCUMENTS

| | | |
|---|---|---|
| 2005/0253951 A1 | 11/2005 | Fujimoto et al. |
| 2008/0186397 A1 | 8/2008 | Kim |
| 2008/0291543 A1 | 11/2008 | Nomura et al. |
| 2009/0295949 A1 | 12/2009 | Ojala |
| 2011/0037879 A1 | 2/2011 | Kwon |
| 2015/0253543 A1 | 9/2015 | Mercado |
| 2016/0044250 A1* | 2/2016 | Shabtay ............... H04N 5/247 348/240.3 |
| 2016/0070088 A1 | 3/2016 | Koguchi |

FOREIGN PATENT DOCUMENTS

| | | |
|---|---|---|
| CN | 101187726 A | 5/2008 |
| CN | 201096952 Y | 8/2008 |
| CN | 202256995 U | 5/2012 |
| CN | 102523377 A | 6/2012 |
| CN | 103217773 A | 7/2013 |
| CN | 204883031 U | 12/2015 |
| CN | 105527702 A | 4/2016 |
| CN | 106405798 A | 2/2017 |
| CN | 206224039 U | 6/2017 |
| JP | 2006215443 A | 8/2006 |
| WO | WO 2013125603 A1 | 8/2013 |
| WO | WO 2015001519 A2 | 1/2015 |

OTHER PUBLICATIONS

Chinese Patent Application No. 201611079262.7 First Office Action dated Apr. 17, 2018, 7 pages.
Chinese Patent Application No. 201611079262.7 English translation of First Office Action dated Apr. 17, 2018, 7 pages.
European Patent Application No. 1717575.6 extended Search and Opinion dated Jan. 19, 2018, 12 pages.
European Patent Application No. 17175756.0 Office Action dated Dec. 17, 2018, 8 pages.

* cited by examiner

IMAGING DEVICE AND ELECTRONIC DEVICE

CROSS-REFERENCE TO RELATED APPLICATIONS

The application claims priority to and benefits of Chinese Patent Application Serial No. 201611079262.7, filed with the State Intellectual Property Office of P. R. china on Nov. 29, 2016, and Chinese Patent Application Serial No. 201621299136.8, filed with the State Intellectual Property Office of P. R. China on Nov. 29, 2016, the entire content of which is incorporated herein by reference.

FIELD

The present disclosure relates to imaging techniques, and particularly, to an imaging device and an electronic device.

BACKGROUND

A dual camera generally includes a wide-angle camera and a telephoto camera, and can achieve a zoom. A zoom ratio depends on a ratio of a field angle of the wide-angle camera to a field angle of the telephoto camera. The wide-angle camera is usually used as a main camera, and in order to guarantee the quality of shooting, the field angle cannot be too large, so the field angle of the telephoto camera needs to be narrowed, which leads to a too large focal length of the telephoto camera and thus an excessive height thereof, such that when the dual camera is applied in a mobile phone, it is not conductive to making the mobile phone lighter and thinner.

SUMMARY

The present disclosure provides a telephoto camera, an imaging device and an electronic device.

A telephoto camera includes a telephoto lens, and the telephoto lens, from an object side to an image side along a light axis, sequentially includes: at least one first lens element; a light reflecting element configured to make the light axis to reflect from a first direction to a second direction; and at least one second lens element.

An imaging device includes a wide-angle camera and a telephoto camera.

A field of view of the telephoto camera is located in a field of view of the wide-angle camera, the telephoto camera includes a telephoto lens, and the telephoto lens includes: at least one first lens element, a light reflecting element and at least one second lens element arranged sequentially from an object side to an image side along alight axis.

The light reflecting element is configured to make the light axis to reflect from a first direction to a second direction.

An electronic device includes a housing and the imaging device.

The imaging device is positioned in the housing, and an axial direction of the wide-angle camera is substantially parallel to a thickness direction of the housing.

BRIEF DESCRIPTION OF THE DRAWINGS

These and/or other aspects and advantages of embodiments of the present disclosure will become apparent and more readily appreciated from the following descriptions made with reference to the drawings, in which.

DETAILED DESCRIPTION

Figure 1:
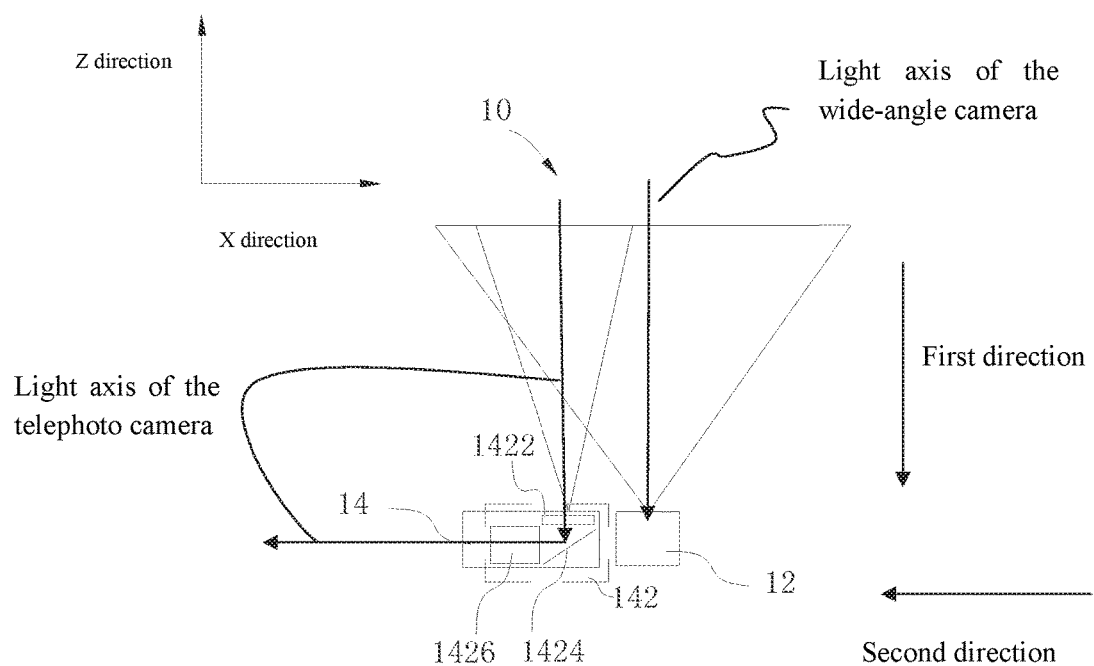
FIG. 1 is a schematic view of an imaging device according to an embodiment of the present disclosure.

Embodiments of the present disclosure will be described in detail and examples of the embodiments will be illustrated in the accompanying drawings. The same or similar elements and the elements having same or similar functions are denoted by like reference numerals throughout the descriptions. The embodiments described herein with reference to the drawings are explanatory, which aim to illustrate the present disclosure, but shall not be construed to limit the present disclosure.

FIG. 1 illustrates an imaging device 10 according to embodiments of the present disclosure. The imaging device 10 includes a wide-angle camera 12 and a telephoto camera 14. A field of view of the telephoto camera 14 is located in a field of view of the wide-angle camera 12. The telephoto camera 14 includes a telephoto lens 142. The telephoto lens 142 includes at least one first lens element 1422, a light reflecting element 1424 and at least one second lens element 1426 arranged in sequence from an object side to an image side along a light axis. The light reflecting element 1424 is configured to make the light axis to reflect from a first direction to a second direction.

Figure 2:
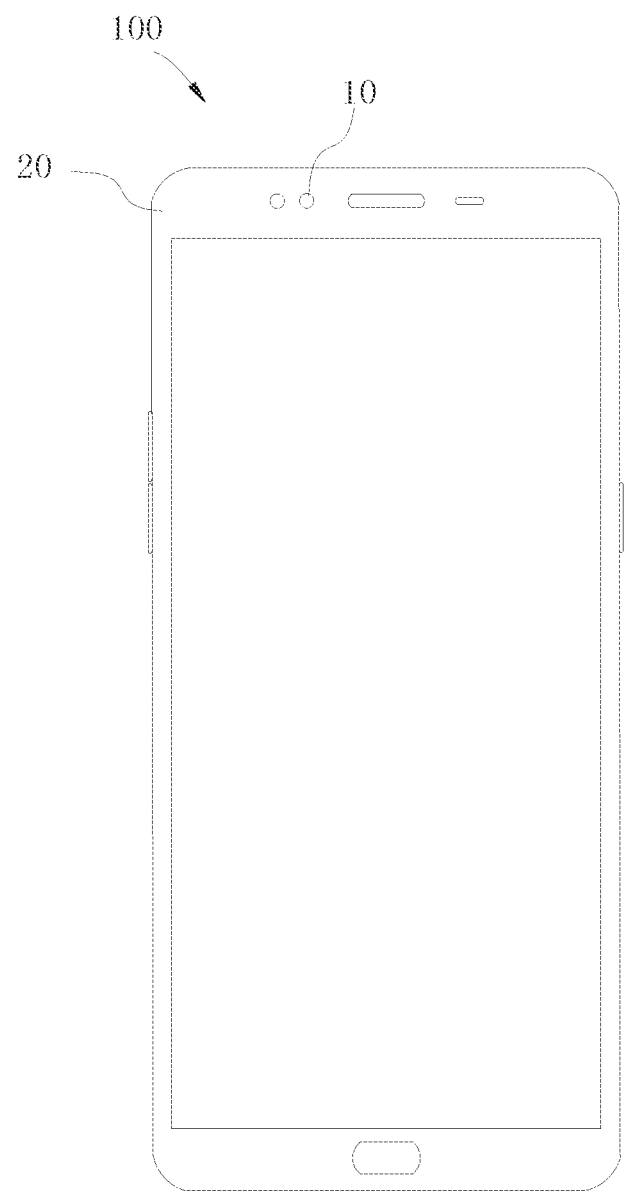
FIG. 2 is a schematic view of an electronic device according to an embodiment of the present disclosure.

FIG. 2 illustrates the imaging device 10 according to the embodiments of the present disclosure. The imaging device 10 may be applied to an electronic device 100 according to embodiments of the present disclosure, or in other words, the electronic device 100 according to embodiments of the present disclosure includes the imaging device 10 according to the embodiments of the present disclosure.

Besides the imaging device 10, the electronic device 100 according to the embodiments of the present disclosure can further include a housing 20. The imaging device 10 is positioned in the housing 20. An axial direction of the wide-angle camera 12 is substantially parallel to a thickness direction of the housing 20.

In the imaging device 10 and the electronic device 100 according to the embodiments of the present disclosure, a light axis of the telephoto lens 142 is reflected. Since the wide-angle camera 12 and the first direction are generally arranged along a height of the imaging device 10, the reflection of the light axis of the telephoto lens 142 may reduce the height of the imaging device 10. Thus, when the imaging device 10 is applied in the electronic device 100 and positioned in the housing 20, and a height direction of the imaging device 10 is substantially parallel to the thickness direction of the housing 20, it is conductive to making the electronic device 100 lighter and thinner.

In some embodiments, the height direction of the imaging device 10 is substantially parallel to the axial direction of the wide-angle camera 12, that is, the height direction of the imaging device 10 is substantially parallel to the thickness direction of the housing 20, denoted by a Z direction in FIG. 1 according to the embodiments of the present disclosure. The height of the imaging device 10 is slightly smaller than a thickness of the housing 20.

Therefore, it is possible to protect the imaging device 10 from receiving intrusion or interference from the outside and ensure normal operations of the imaging device 10, by utilizing a thickness of the electronic device 100 and accommodating the imaging device 10 in the housing 20.

In some embodiments, a field angle of the wide-angle camera 12 is 75 degrees to 85 degrees, while a field angle of the telephoto camera 14 is 20 degrees to 60 degrees.

It could be understood that the larger the field angle of the wide-angle camera 12 is, the more advantageous it is to reduce the height of the imaging device 10. However, since the wide-angle camera 12 usually serves as a main camera, and an excessive field angle may lead to degradation of the image quality, it is advantageous to control the height of the imaging device 10 and guarantee an imaging effect of the wide-angle camera 12 if the field angle of the wide-angle camera 12 is set to 75 degrees to 85 degrees. In this embodiment, the field angle of the wide-angle camera 12 is about 80 degrees.

It could be understood that the smaller the field angle of the telephoto camera 14 is, the more advantageous it is to improve a zoom ratio of the imaging device 10, but a height of the telephoto camera 14 will be increased thereby. If the field angle of the telephoto camera 14 is too large, it is not conductive to increasing the zoom ratio of the imaging device 10. Thus, the field angle of the telephoto camera 14 may be set to 20 degrees to 60 degrees, which not only improves the zoom ratio of the imaging device 10 but also controls the size of the imaging device 10. In this embodiment of the present disclosure, the field angle of the telephoto camera 14 is about 40 degrees.

In some embodiments, the height of the telephoto camera 14 is smaller than or equal to a height of the wide-angle camera 12.

It could be understood that the reflection of the light axis of the telephoto lens 142 is intended to lower the height of the telephoto camera 14, and in order to make the electronic device 100 lighter and thinner, the height of the telephoto camera 14 after the reflection is slightly smaller than or approximately equal to the height of the wide-angle camera 12.

In some embodiments, the field of view of the telephoto camera 14 is located in the field of view of the wide-angle camera 12.

Thus, when the wide-angle camera 12 is operated, a user zooms a cached wide-angle image of the wide-angle camera 12, and the operation is switched to the telephoto camera 14 once the zooming reaches the field angle of the telephoto camera 14. Since the field of view of the telephoto camera 14 is located in the field of view of the wide-angle camera 12, it is possible to image a subject that the user originally wants to shoot, without need to adjust the position of the telephoto camera 14.

In some embodiments, the height of the telephoto camera 14 is greater than the height of the wide-angle camera 12.

Thus, it is necessary to use the telephoto camera 14 according to the embodiments of the present disclosure, and with the advantages of the telephoto camera 14 according to the embodiments of the present disclosure, the telephoto camera 14 will not affect the lightening and thinning of the electronic device 100 when operating normally.

In some embodiments, a light axis of the wide-angle camera 12 is parallel to the first direction. In practical situations, due to technological reasons or camera loosening and other factors, the light axis of the wide-angle camera 12 might not be parallel to the first direction, and instead have a certain included angle, for example, an included angle of 2 degrees relative to the first direction, which is not limited herein.

Therefore, the light axis of the wide-angle camera 12 is substantially parallel to the first direction of the light axis of the telephoto camera 14, such that the field of view of the telephoto camera 14 is located in the field of view of the wide-angle camera 12, and when zooming, the user can focus on and shoot the subject captured by the wide-angle camera 12 without need to adjust the electronic device 100 by a large angle.

Figure 3:
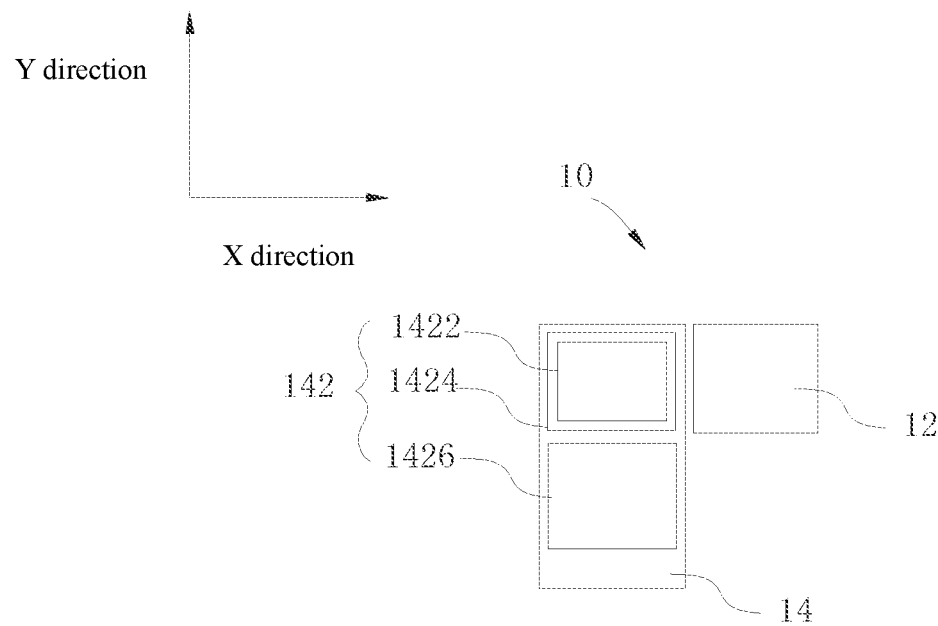
FIG. 3 is a schematic view of an imaging device according to some embodiments of the present disclosure.
Figure 4:
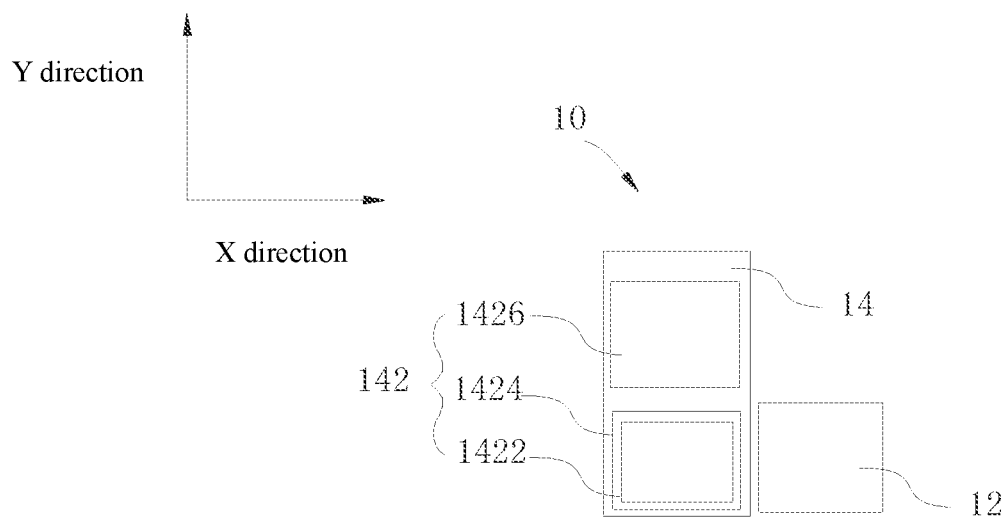
FIG. 4 is a schematic view of an imaging device according to some embodiments of the present disclosure.

FIGS. 1, 3 and 4 together illustrate the telephoto camera 14 in some embodiments. The telephoto camera 14 is arranged adjacent to and juxtaposed to the wide-angle camera 12, and the second direction extends along a direction away from the wide-angle camera 12. In the figures according the embodiments of the present disclosure, an X direction refers to a direction where a width of the electronic device 100 is located, a Y direction refers a direction where a length of the electronic device 100 is located, and the Z direction refers a direction where the thickness of the electronic device 100 is located.

Therefore, it is possible to increase an overlapping portion of the field of view of the telephoto camera 14 with the field of view of the wide-angle camera 12, that is, to improve a proportion of the field of view of the telephoto camera 14 to the field of view of the wide-angle camera 12. Since the subject to be shot is the same when the zoom is realized by the wide-angle camera 12 and the telephoto camera 14, it is possible to enhance an imaging ability of the imaging device 10 and avoid an unnecessary operation of moving the electronic device 100 by the user, if the telephoto camera 14 is arranged adjacent to and juxtaposed to the wide-angle camera 12.

In some embodiments, the direction away from the wide-angle camera 12 may be the X direction or the Y direction, that is, the second direction may be the direction where the length of the electronic device 100 is located or the direction where the width of the electronic device 100 is located.

Thus, a direction where the second lens element 1426 is located is not the direction where the thickness of the electronic device 100 is located, so the thickness of the electronic device 100 will not be increased if the telephoto camera 14 is accommodated in the electronic device 100.

In some embodiments, an area of the light reflecting element 1424 projected to an X-Y plane may be slightly larger than or approximately equal to an area of the first lens element 1422 projected to the X-Y plane.

Thus, all of the light gathered from the first lens element 1422 may be reflected to the second lens element 1426 via the light reflecting element 1424, so as to make use of external incident light to the greatest extent, avoid loss of the incident light, and enhance the imaging ability of the imaging device 10.

In some embodiments, the second direction is perpendicular to the first direction. In practical situations, due to technological reasons or loosening of the light reflecting element 1424 and other factors, the second direction might not be perpendicular to the first direction, and instead have a certain included angle, for example, an included angle of 88 degrees relative to the first direction, which is not limited herein.

Thus, it is possible to define the second direction as the direction where the length of the electronic device 100 is located or the direction where the width of the electronic device 100 is located, such that a spatial advantage of the electronic device 100 in a non-thickness direction of the electronic device 100 may be utilized, and the telephoto camera 14 will not affect the lightening and thinning of the electronic device 100 when ensuring a large focal length.

In the embodiments of the present disclosure, the telephoto lens 142 includes the first lens element 1422, the light reflecting element 1424 and the second lens element 1426. The incident light is condensed by the first lens element 1422, which may increase an incidence rate of the incident light, reduce the loss of light caused by scattering or diffusing of the light, improve brightness of the light received by the telephoto camera 14, and enhance work efficiency of the telephoto camera 14. In addition, the first lens element 1422 is positioned at a light inlet position of the telephoto camera 14 to prevent dust or other sources of contamination from entering the telephoto camera 14, which otherwise may cause the telephoto camera 14 to fail to function properly.

In some embodiments, one first lens element 1422 and one second lens element 1426 may be provided, or a plurality of first lens elements 1422 and a plurality of second lens elements 1426 may be provided, which will not be limited herein.

In some embodiments, the light reflecting element 1424 includes a reflective mirror or a reflective prism.

Thus, with a reflecting effect of the light reflecting element 1424, the direction of the incident light may be changed, such that the second lens element 1426 may be positioned along the second direction, which may increase the height of the telephoto camera 14 considerably and will not affect the lightening and thinning of the electronic device 100.

In some embodiments, the electronic device 100 includes a mobile photo or a tablet computer, which will not be limited herein. In the embodiments of the present disclosure, the electronic device 100 is configured as the mobile phone.

In some embodiments, the imaging device 10 includes a front dual camera or a rear dual camera.

In the description of embodiments of the present disclosure, it is to be understood that terms such as "central," "longitudinal", "transverse", "length," "width," "thickness," "upper," "lower," "front," "rear," "left," "right," "vertical," "horizontal," "top," "bottom," "inner," "outer," "clockwise," and "counterclockwise" should be construed to refer to the orientation or the position as described or as shown in the drawings under discussion. These relative terms are only used to simplify description of the present disclosure, and do not indicate or imply that the device or element referred to must have a particular orientation, or constructed or operated in a particular orientation. Thus, these terms cannot be constructed to limit the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

In the description of embodiments of the present disclosure, unless specified or limited otherwise, the terms "mounted," "connected," "coupled" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the embodiments of the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Various embodiments and examples are provided in the above description to implement different structures of the present disclosure. In order to simplify the present disclosure, certain elements and settings are described in the above. However, these elements and settings are only by way of example and are not intended to limit the present disclosure. In addition, reference numbers and/or reference letters may be repeated in different examples in the present disclosure. This repetition is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

Reference throughout this specification to "an embodiment," "some embodiments," "an exemplary embodiment," "an example," "a specific example" or "some examples" means that a particular feature, structure, material, or characteristic described in connection with the embodiment or example is included in at least one embodiment or example of the present disclosure. Thus, the appearances of the above phrases throughout this specification are not necessarily referring to the same embodiment or example of the present disclosure. Furthermore, the particular features, structures, materials, or characteristics may be combined in any suitable manner in one or more embodiments or examples.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which it should be understood by those skilled in the art that functions may be implemented in a sequence other than the sequences shown or discussed, including in a substantially identical sequence or in an opposite sequence.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Although embodiments of the present disclosure have been shown and described, it would be appreciated by those skilled in the art that the embodiments are explanatory and cannot be construed to limit the present disclosure, and changes, modifications, alternatives and variations can be made in the embodiments without departing from the scope of the present disclosure.

What is claimed is:

1. An imaging device, comprising:
    a wide-angle camera; and
    a telephoto camera, a field of view of the telephoto camera being located in a field of view of the wide-angle camera, the telephoto camera comprising a telephoto lens, the telephoto lens, from an object side to an image side along a light axis, sequentially comprising:
        at least one first lens element;
        a light reflecting element configured to make the light axis to reflect from a first direction to a second direction; and
        at least one second lens element;
        wherein a height direction of the imaging device is consistent with a direction of a light axis of the wide-angle camera, and a height of the telephoto camera is smaller than or equal to a height of the wide-angle camera.

2. The imaging device according to claim 1, wherein a field angle of the wide-angle camera is 75 degrees to 85 degrees, while a field angle of the telephoto camera is 20 degrees to 60 degrees.

3. The imaging device according to claim 1, wherein the light axis of the wide-angle camera is parallel to the first direction.

4. The imaging device according to claim 1, wherein the telephoto camera is arranged adjacent to and juxtaposed to the wide-angle camera, and the second direction extends along a direction away from the wide-angle camera.

5. The imaging device according to claim 1, wherein the second direction is perpendicular to the first direction.

6. The imaging device according to claim 1, wherein the light reflecting element comprises a reflective mirror or a reflective prism.

7. An electronic device, comprising:
    a housing; and
    an imaging device positioned in the housing and comprising a wide-angle camera and a telephoto camera, a field of view of the telephoto camera being located in a field of view of the wide-angle camera, the telephoto camera comprising a telephoto lens, and the telephoto lens, from an object side to an image side along a light axis, sequentially comprising:
        at least one first lens element;
        a light reflecting element configured to make the light axis to reflect from a first direction to a second direction; and
        at least one second lens element,
    an axial direction of the wide-angle camera being substantially parallel to a thickness direction of the housing;
    wherein a height direction of the imaging device is consistent with a direction of a light axis of the wide-angle camera, and a height of the telephoto camera is smaller than or equal to a height of the wide-angle camera.

8. The electronic device according to claim 7, wherein a field angle of the wide-angle camera is 75 degrees to 85 degrees, while a field angle of the telephoto camera is 20 degrees to 60 degrees.

9. The electronic device according to claim 7, wherein the light axis of the wide-angle camera is parallel to the first direction.

10. The electronic device according to claim 7, wherein the telephoto camera is arranged adjacent to and juxtaposed to the wide-angle camera, and the second direction extends along a direction away from the wide-angle camera.

11. The electronic device according to claim 7, wherein the second direction is perpendicular to the first direction.

12. The electronic device according to claim 7, wherein the light reflecting element comprises a reflective mirror or a reflective prism.

13. The electronic device according to claim 7, wherein the electronic device comprises a mobile phone or a tablet computer.

14. The electronic device according to claim 7, wherein the imaging device comprises a front dual camera or a rear dual camera.

15. An imaging device, comprising:
   a wide-angle camera; and
   a telephoto camera, a field of view of the telephoto camera being located in a field of view of the wide-angle camera, the telephoto camera comprising a telephoto lens, the telephoto lens, from an object side to an image side along a light axis, sequentially comprising:
   at least one first lens element;
   a light reflecting element configured to make the light axis to reflect from a first direction to a second direction; and
   at least one second lens element;
   wherein a height direction of the imaging device is consistent with a direction of a light axis of the wide-angle camera, and a height of the telephoto camera is greater than a height of the wide-angle camera.

* * * * *